(12) United States Patent
Luzaich et al.

(10) Patent No.: US 7,047,762 B2
(45) Date of Patent: May 23, 2006

(54) COMPACT PRESERVATION AND REFRIGERATION SYSTEM FOR PERISHABLE SUBSTANCES

(76) Inventors: Gregory J. Luzaich, 600 American Way, Windsor, CA (US) 95492; Teddy R. Bryant, 1246 Grandview Rd., Sebastopol, CA (US) 95472

( * ) Notice: Subject to any disclaimer, the term of this patent is extended or adjusted under 35 U.S.C. 154(b) by 0 days.

(21) Appl. No.: 10/765,632

(22) Filed: Jan. 26, 2004

(65) Prior Publication Data
US 2004/0154311 A1    Aug. 12, 2004

Related U.S. Application Data

(60) Provisional application No. 60/443,101, filed on Jan. 27, 2003.

(51) Int. Cl.
*F25B 21/02* (2006.01)
*F25D 3/08* (2006.01)

(52) U.S. Cl. .............................. 62/457.8; 62/3.2; 62/3.6
(58) Field of Classification Search ................... 62/3.2, 62/3.6, 3.64, 78, 457.8; 53/79, 510; 141/37; 222/152
See application file for complete search history.

(56) References Cited

U.S. PATENT DOCUMENTS

| | | | | |
|---|---|---|---|---|
| 2,110,518 A | * | 3/1938 | Becker | 222/152 |
| 4,473,174 A | * | 9/1984 | Heuser | 222/152 |
| 4,475,576 A | * | 10/1984 | Simon | 141/98 |
| 4,477,477 A | * | 10/1984 | Arter | 426/330.4 |
| 4,484,695 A | * | 11/1984 | Fallon et al. | 222/23 |
| 4,691,842 A | * | 9/1987 | Foures | 222/1 |
| 4,702,396 A | * | 10/1987 | Gwiazda | 222/152 |
| 5,255,713 A | * | 10/1993 | Scholle et al. | 137/614.04 |
| 5,566,730 A | * | 10/1996 | Liebmann, Jr. | 141/64 |
| 5,572,872 A | * | 11/1996 | Hlavacek | 62/3.6 |
| 6,370,883 B1 | * | 4/2002 | Kugel | 62/3.64 |
| 6,557,369 B1 | * | 5/2003 | Phelps et al. | 62/457.5 |
| 6,595,109 B1 | * | 7/2003 | Liebmann, Jr. | 99/323 |

FOREIGN PATENT DOCUMENTS

| | | | |
|---|---|---|---|
| EP | 0851026 A2 | * | 7/1998 |
| FR | 2693437 A1 | * | 1/1994 |
| JP | 05000048 A | * | 1/1993 |

\* cited by examiner

*Primary Examiner*—Cheryl Tyler
*Assistant Examiner*—Richard L. Leung
(74) *Attorney, Agent, or Firm*—Dergosits & Noah LLP

(57) ABSTRACT

A device for storage of an opened food container such as a wine container. The device includes a housing for receiving the opened food container in a substantially vertical orientation. A poppet valve assembly is provided for insertion in an opening in the opened food container and biased to enable it to accommodate opened food containers of varying sizes. The device includes a pressurized source of heaver-than-air inert gas located within the housing, a regulator for reducing the pressure of the inert gas from a first pressure at the pressurized source of the heavier-than-air inert gas to second pressure at the poppet valve assembly. The poppet valve assembly also includes a spring-loaded check ball, low-pass port, shuttle and orifice to control pressure and flow path of the heavier-than-air inert gas and to direct the heavier-than-air inert gas to the opened food container thus displacing any air that may have been present therein through an exhaust port.

21 Claims, 7 Drawing Sheets

SECTION A

SECTION B

SECTION C

COMPACT PRESERVATION AND REFRIGERATION SYSTEMS FOR PERISHABLE SUBSTANCES

SECTION D

COMPACT PRESERVATION AND REFRIGERATION
SYSTEMS FOR PERISHABLE SUBSTANCES

SECTION E

COMPACT PRESERVATION AND REFRIGERATION SYSTEMS FOR PERISHABLE SUBSTANCES

SECTION B

COMPACT PRESERVATION AND REFRIGERATION SYSTEMS FOR PERISHABLE SUBSTANCES

US 7,047,762 B2

COMPACT PRESERVATION AND REFRIGERATION SYSTEM FOR PERISHABLE SUBSTANCES

This application claims the benefit of Provisional Application No. 60/443,101, filed Jan. 27, 2003.

TECHNICAL FIELD AND INVENTION

The present invention is directed to a device for the storage of an opened food container, such as an opened wine container or wine bottle. It has been recognized that food products such as wine and coffee, once opened and exposed to ambient air, oxidize thus changing their sought after characteristic taste. The present invention aids in the preservation of said food products and does so in a convenient compact package which can be completely self-contained or powered by an external power supply.

BACKGROUND OF THE INVENTION

Although the present invention will be described in terms of the preservation of wine, the invention can be extended to other food products such as coffee beans and ground coffee which similarly suffer ill effects when exposed to ambient (air) conditions.

Virtually anyone who routinely drinks wine notices that if a bottle of wine is uncorked and not completely consumed, the wine contained within the bottle changes in physical and chemical characteristics making the wine much less enjoyable to consume as time passes. This is caused by oxidation, that is, the bonding of oxygen molecules to oxidisable compounds present within the wine. Oxidation of wine results in the production of brown compounds and browning of red pigments with loss of color. It further results in the production of aldehydes and desirable grape (primary), fermentation (secondary) and aging (tertiary) derived flavors. The production of new undesirable flavor compounds can mask the desirable flavor compounds.

Such oxidisable compounds in wine include phenolics, alcohols and some flavor aldehyde compounds. Although all wines suffer from oxidation, because of the high concentration of phenolics extracted from grape skins during red wine production, red wine has a high reserve of oxidisable compounds and hence appears more sensitive to oxidative spoilage. Sulfur dioxide added to red wine loosely binds to red wine pigments decolorizing the pigment molecules and rendering a portion of the sulfur dioxide ineffective. Sulfur dioxide is also used to inhibit microbial growth and is thus a highly desirable additive for use in red wines.

It has thus been recognized that it is highly desirable to limit or entirely prevent oxygen, such as that contained in ambient air, from contacting the surface of a food product, such as wine, in order to maintain the product's desirable flavor and other physical characteristics.

There have been rather rudimentary attempts to inject an inert gas in the free space of an opened wine bottle in order to displace air contained therein. Such devices generally are in the form of a syringe-like product which enables the user to withdraw air from the bottle's free space or to inject a gas therein. However, such devices have proven to be ineffective in the flow of the inert gas to the free space above the wine and in removal of the ambient air to substantially reduce oxidation.

It is thus an object of the present invention to provide a device, in a simple small and compact housing through the use of a single external control switch to enable one to preserve food products, such as wine and coffee, from the ill effects of oxidation.

It is yet a further object of the present invention to provide a device such as that described above which can not only minimize oxidation but also control the food product's temperature, a desirable expedient in preserving food for an extended duration and to maintain the food product at its proper serving temperature.

These and further objects can be more readily appreciated when considering the following disclosure and appended drawings.

SUMMARY OF THE INVENTION

A device for storage of an opened food container such as a wine container. The device includes a housing for receiving the opened food container in a substantially vertical orientation. A poppet valve assembly is provided for insertion in an opening in the opened food container and biased to enable it to accommodate opened food containers of varying sizes. The device includes a pressurized source of heaver-than-air inert gas located within the housing, a regulator for reducing the pressure of the inert gas from a first pressure at the pressurized source of the heavier-than-air inert gas to second pressure at the poppet valve assembly. The poppet valve assembly also includes a spring-loaded check ball, low-pass port, shuttle and orifice to control pressure and flow path of the heavier-than-air inert gas and to direct the heavier-than-air inert gas to the opened food container thus displacing any air that may have been present therein through an exhaust port.

DETAILED DESCRIPTION OF THE INVENTION

Device 10 is shown as a storage system in its preferred embodiment, capable of preserving a single, opened bottle of wine at a predetermined and controllable temperature appropriate for the food product being stored over an extended period of time. As noted previously, wine preservation is managed by the introduction of a gas or gas blend into the opened bottle of wine to displace air contained within the free space above the liquid and within the bottle thus eliminating or substantially reducing the oxidation that typically renders wine less desirable for consumption allowing it to be drinkable for an extended period of time. As will be noted below, storage temperatures can be managed through the use of a solid-state thermolelectric heating and cooling system. Ideally, Device 10 can be composed of either metal or plastic.

Figure 1:
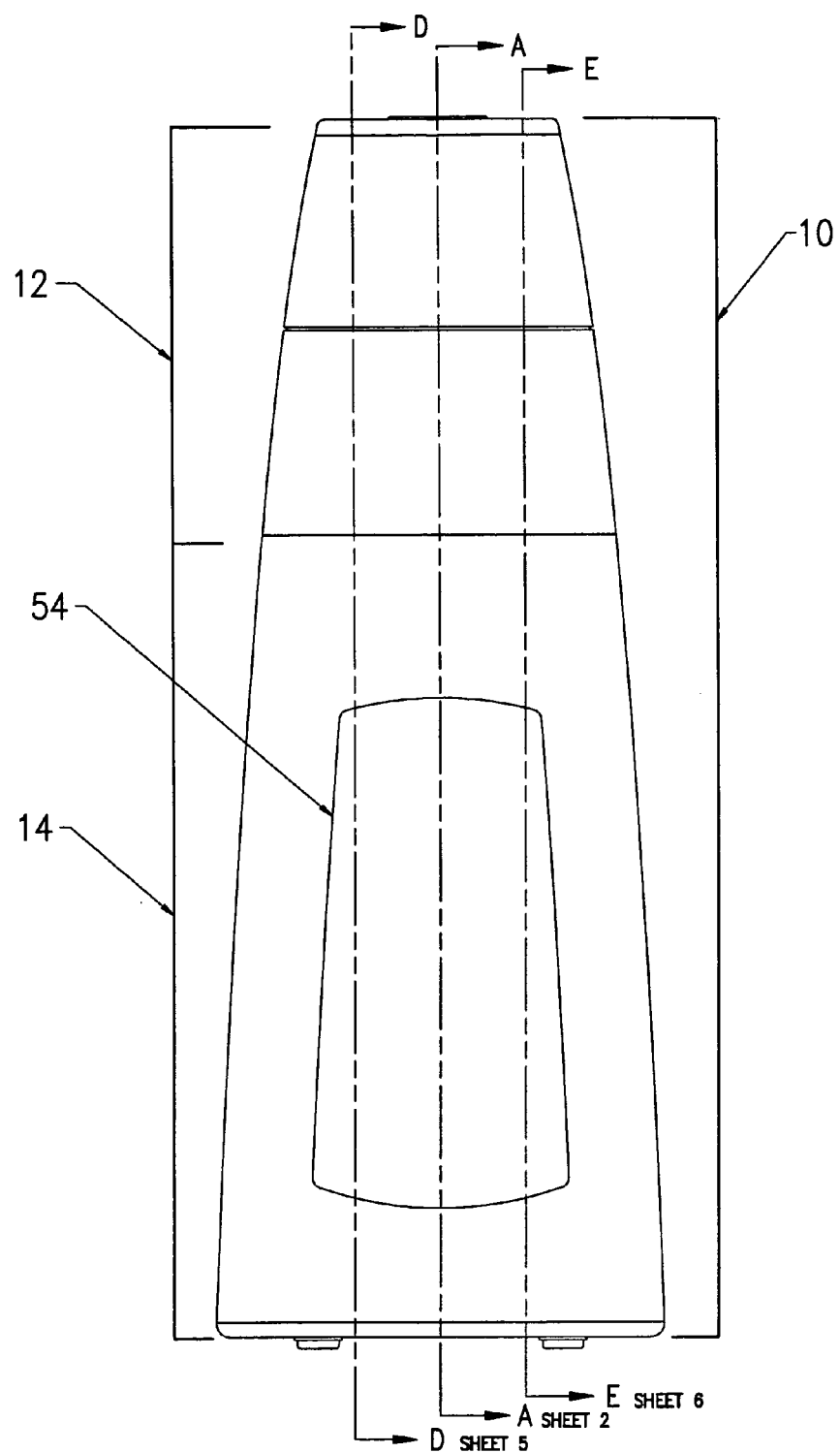
FIG. 1 is a side plan view showing the external housing of the presented device.

Turning again to FIG. 1, Device 10 is shown as constituting upper assembly 12 and lower assembly 14 and see-through window area 54 to enable one to view the food product container, such as a wine bottle label therethrough. In operation, the upper and lower assemblies can be separated enabling the user to place an opened bottle of wine in lower assembly 14. Once the bottle is in place, the assemblies are joined enabling one to begin the process of replacing air within the bottle with heavier-than-air inert gas such as argon to prevent or substantially reduce oxidation. Once the upper assembly has been installed into the lower assembly, the storage temperature can be set for the desired type of wine or other food product.

Figure 3:
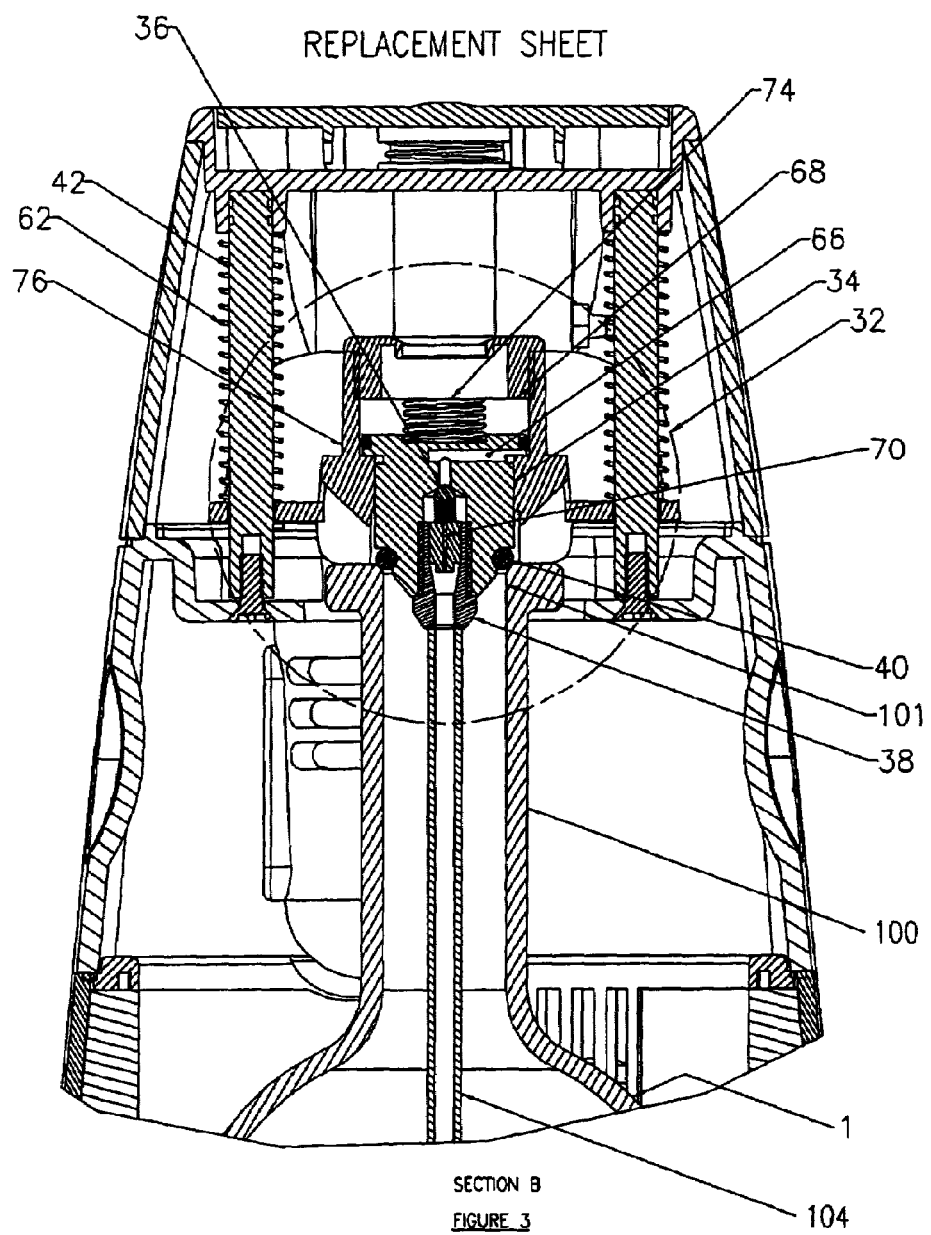
FIG. 3 is an expanded side cross-sectional view showing the details of a poppet valve assembly constituting a portion of the present invention in a closed shuttle orientation.
Figure 4:
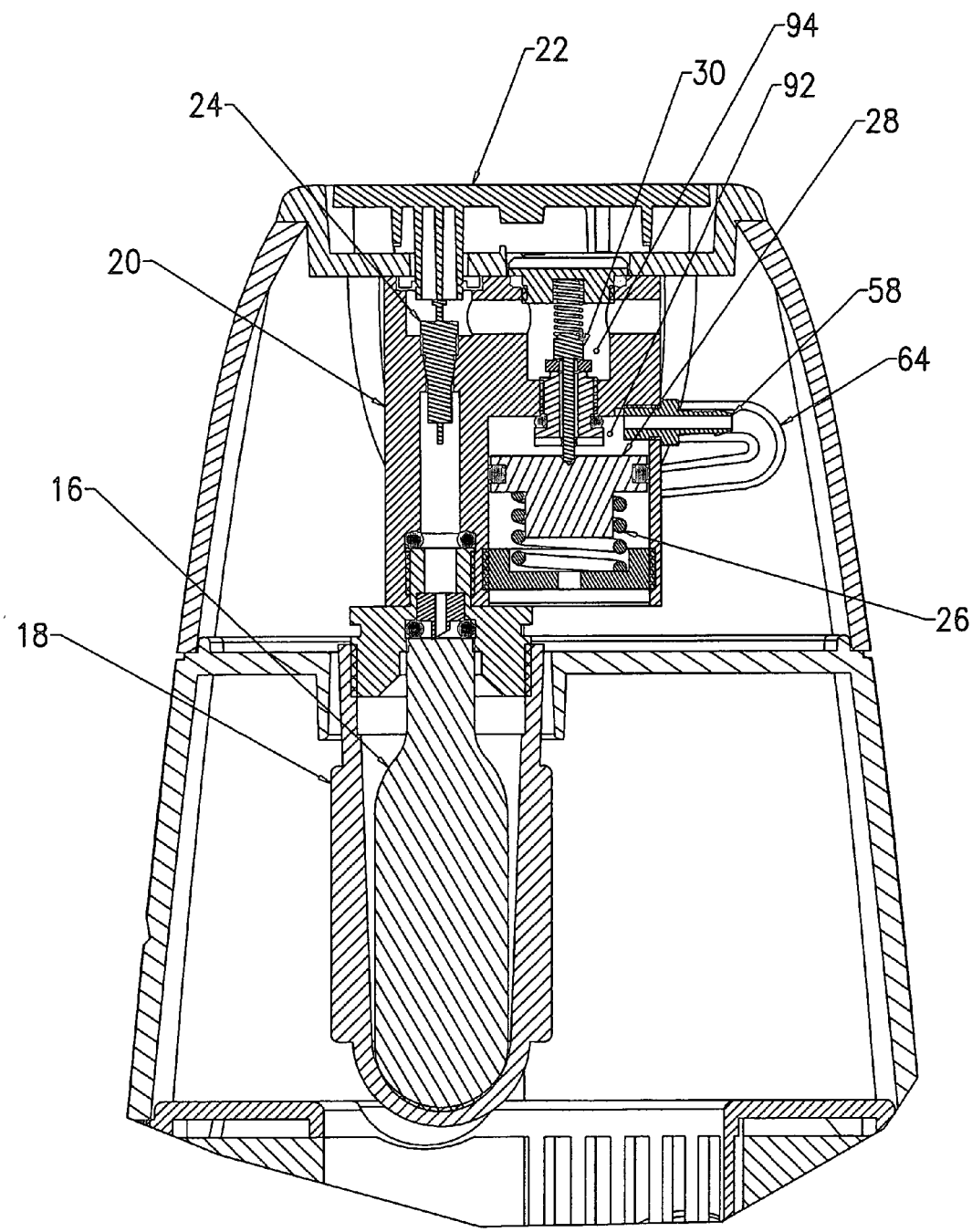
FIG. 4 is a further expanded side cross-section view showing the details of a compression valve assembly and assorted valve delivery devices constituting a portion of the present invention.

Turning to FIG. 4, the overall gas cartridge and delivery system can be best visualized. In doing so, activation lever 22 is provided in conjunction with replaceable gas cartridge 16 containing heavier-than-air inert gas. A threaded safety barrel 18 is shown attaching gas cartridge 16 to gas pressure regulator assembly 20. Once the upper assembly is placed onto lower assembly 12 (FIG. 1) poppet valve assembly 32 (FIG. 3) is displaced vertically, to accommodate variations in bottle height.

Figure 2:
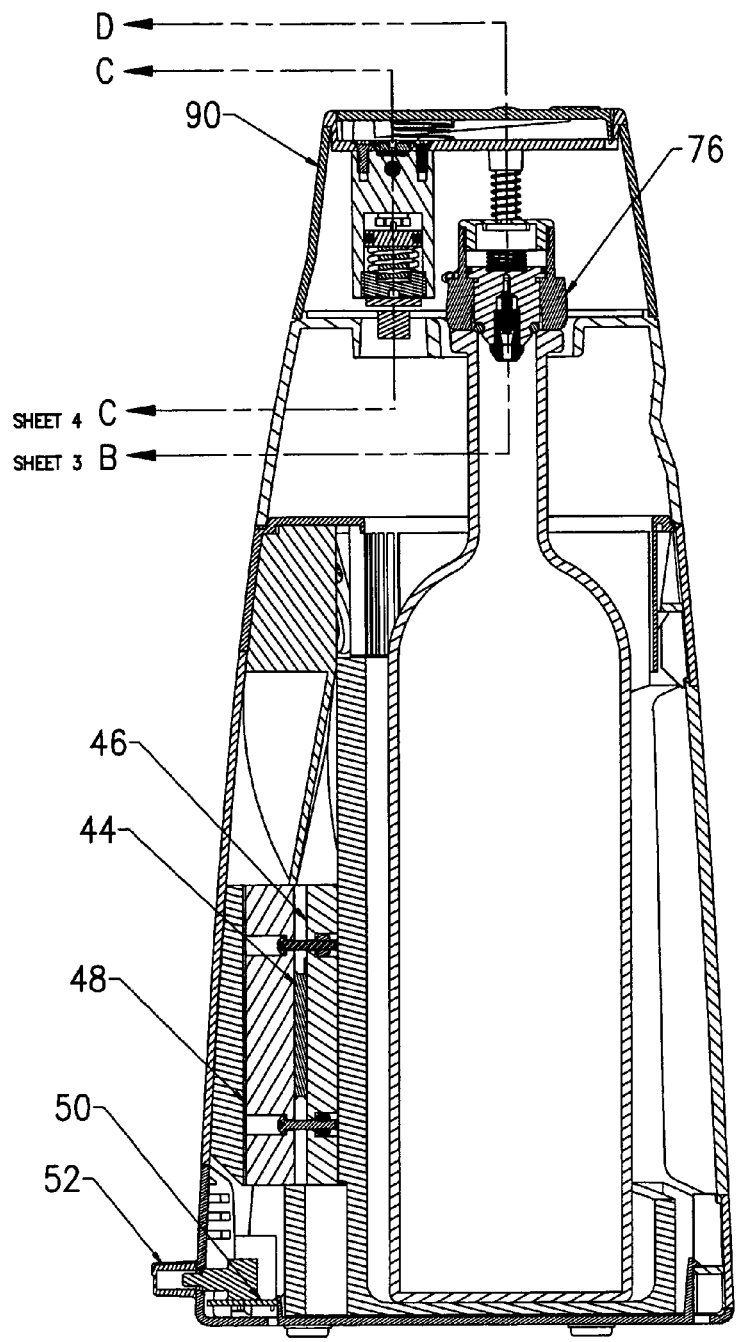
FIG. 2 is side cross-sectional view taken along sectional line A—A of FIG. 1.

Poppet valve assembly 32 essentially floats in a predetermined range to accept most wine bottle heights. To facilitate this, poppet valve assembly 32 is mounted on guide pins 42 wherein poppet valve body 76 contacts the bottle to perform compensation for varying bottle height and remains in contact with the bottle opening as long as bottle remains within this device as shown in FIG. 2. Poppet valve assembly 32 is spring-loaded by providing two springs 62 located axially about poppet valve guide pins 42.

In operation, by depressing lever 22 air valve 24 is depressed allowing high pressure gas stored in replaceable gas cartridge 16 to flow to pressure regulation chamber 92. The gas pressure regulator is composed of counter-balance spring 26, piston 28 and flow control needle 30. In combination, these elements reduce the high pressure in the range of 1000-to-2500 psi to a preferred operating pressure of approximately 15-to-20 psi. It is noted that low-pressure exits from the regulator section 92 via flexible tube 64 and port 58.

Figure 7:
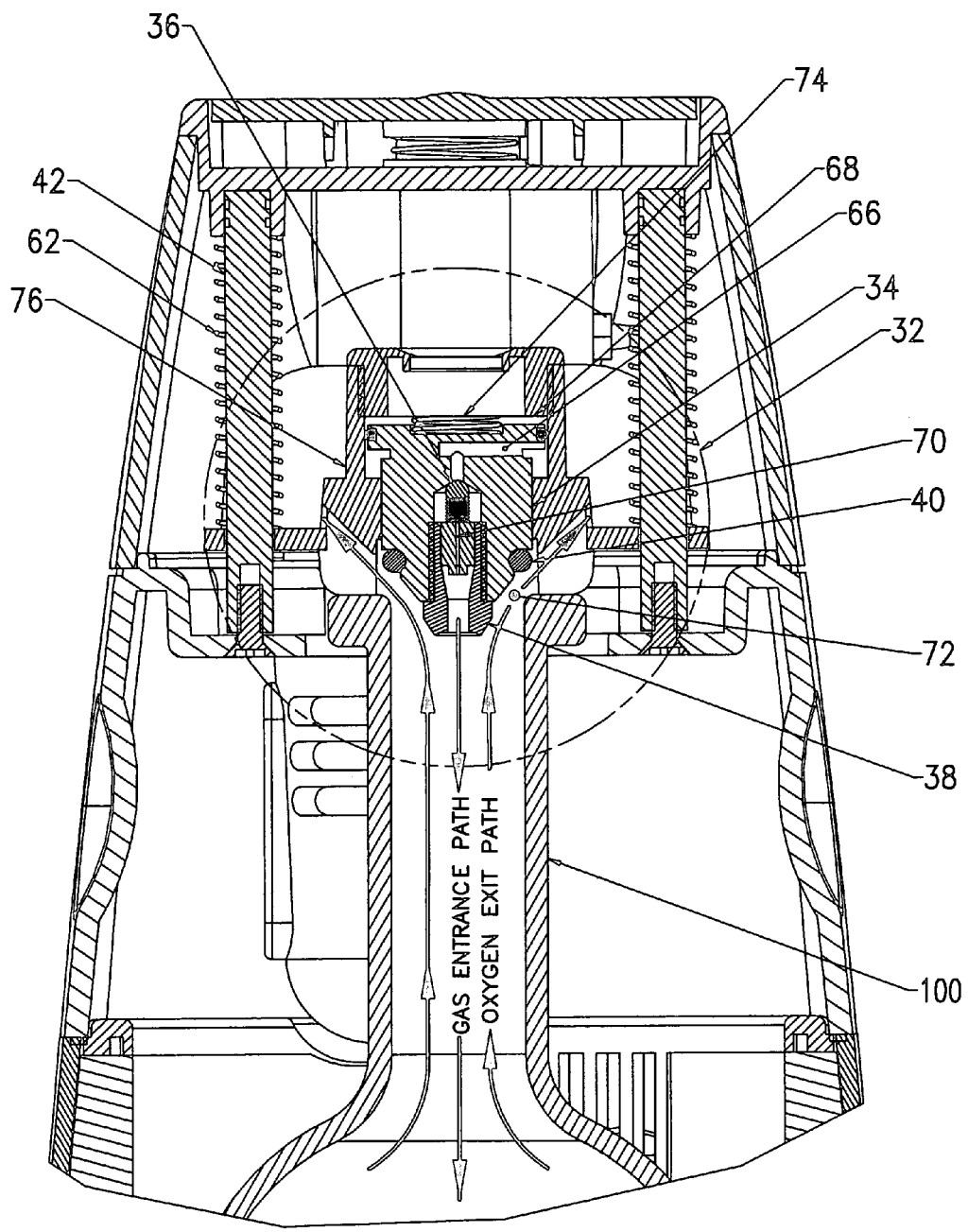
FIG. 7 is an expanded side cross-sectional view showing the details of a poppet valve assembly in an open shuttle orientation.

Once in flexible tube 64, the heavier-than-air inert gas is directed to poppet valve assembly 32 (FIG. 3) which, as noted sits atop neck 100 of wine bottle 1. Heavier-than-air inert gas enters poppet valve assembly 32 through low-pass port 66. A spring-loaded check ball 36 forces pressure to build in low-pass port 66 forcing shuttle 34 upward until it reaches vertical stop 68 noting that poppet valve body remains in contact with bottle 1 at all times. As the shuttle rises, access to gas exit path 72 (FIG. 7) is created at the top of the bottle. Once the shuttle hits its stop, the pressure in low-pass port 66 increases until check ball 36 is unseated. Gas then flows by check ball 36 through orifice 70 and is exhausted through nozzle 38. As noted, although shuttle 34 vertically rises upon the introduction of heavier-than-air inert gas to neck 100 of bottle 1, valve body 76, which is preferably perforated to enable air to escape from bottle 1, remains in contact with the bottle at its neck 100.

It is noted that orifice 70 causes reduction in overall gas flow rate. This reduced area orifice can be eliminated if the size of nozzle 38 is reduced in diameter. This nozzle is designed such that gas remains in a concentrated stream that disburses very little as it enters neck 100 of wine bottle 1. Once heavier-than-air inert gas confronts the liquid contained within the bottle, the gas disperses at the surface of the liquid, thus displacing air with the heavier-than-air inert gas. As the inert gas continues to inject in bottle 1 at neck 100, the surface level of the inert gas rises and eventually displaces any air which was otherwise contained within the bottle, removing the oxygen content responsible for oxidation and thus spoilage of the wine or other food product. In other words, the inert gas collects at the bottom of the free space above the liquid and pushes existing air out of bottle 1. As the inert gas is chosen to have a molecular weight higher than air, it will remain below air as the air is pushed out of the bottle. In doing so, air otherwise contained within the bottle exits the bottle through poppet exhaust port 72 and exits the housing through exhaust housing vent port 90.

Once lever 22 atop present device 10 is released, gas pressure to gas pressure regulation chamber 92 is interrupted and gas pressure to poppet valve assembly 32 is eliminated and shuttle 34 is forced against mouth 101 by spring 74. Gasket 40 on shuttle 34 seals bottle 100 to prevent gas from escaping, thus preserving the bottle contents beneath an atmosphere of the heavier-than-air inert gas noting that check ball 36 prevents backflow of either oxygen or inert gas.

Figure 5:
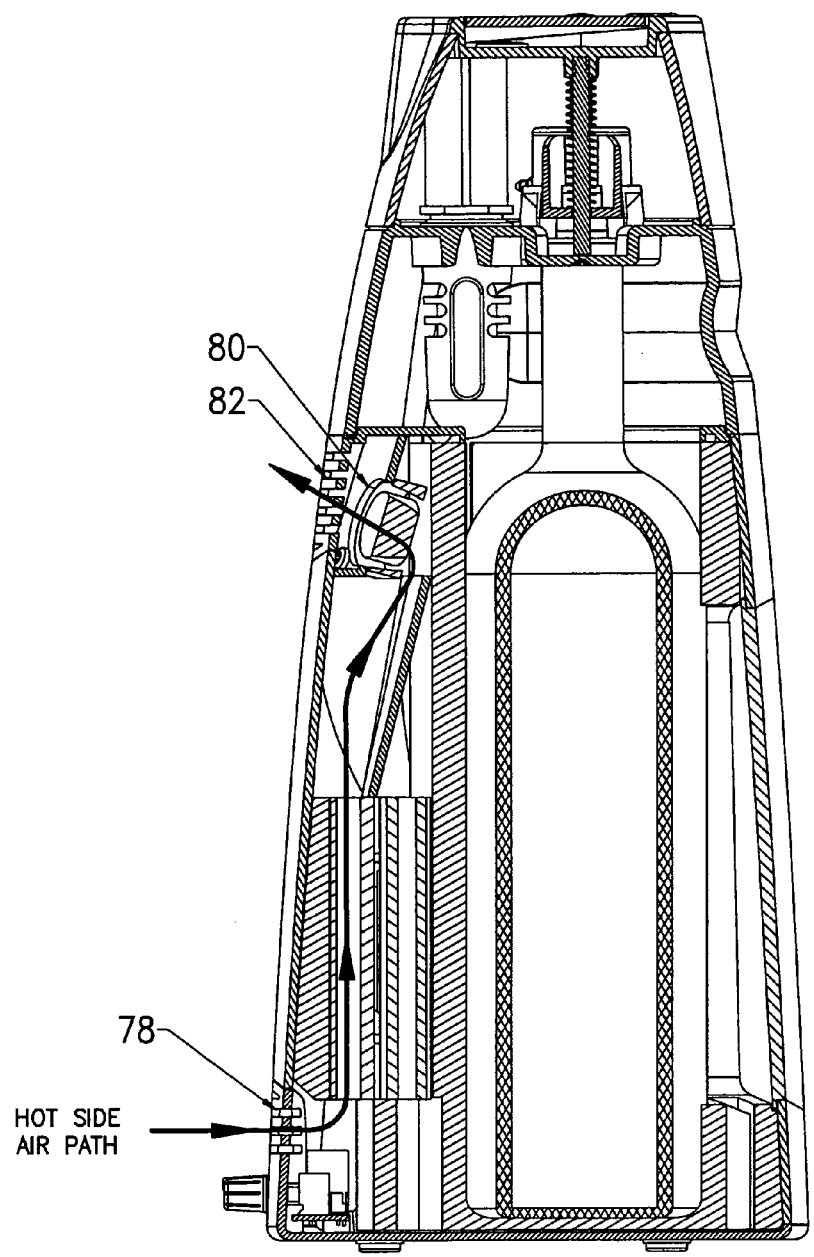
FIG. 5 is a side cross-sectional view taken along line D—D of FIG. 1.
Figure 6:
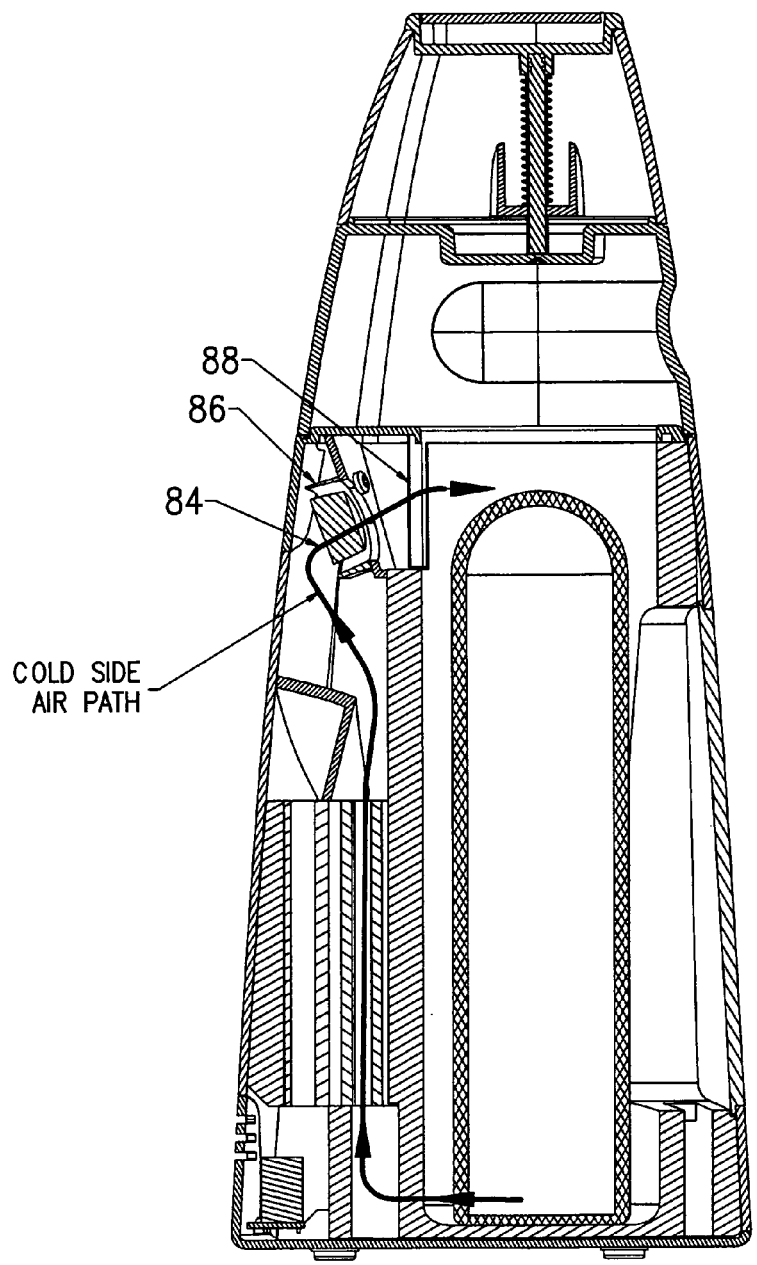
FIG. 6 is a side cross-sectional view of the present invention taken along line E—E of FIG. 1.

As noted previously, the compact packaging of the present invention further contemplates employing a cooling system to maintain the storage temperature of the food product. Reference is made to FIGS. 2, 5 and 6 showing thermolelectric cooler 44 creating a temperature differential between two separate forced air circuits. The two circuits are thermally separate as "cold air" and "hot air" circuits. Wine bottle 1 is placed in the closed loop cold air circuit. Thermolelectric cooler 44 extracts heat from the cold air circuit and transfers it to the hot air circuit where it is exhausted to the atmosphere.

In operation, the hot side circuit draws ambient air through entrance port 78. The air is then drawn over the hot side heat sink 48 where it becomes heated due to the convective heat transfer from the hot heat sink to ambient air. The air is then drawn through hot-side fan 80 and exhausted through hot-side exhaust port 82.

As noted, cooling is provided through the use of a cool-air circuit as a closed loop system cooling the food product contained within the device of the present invention. Air is drawn through cold-air return port 84 and is then drawn over cold-side heat sink 46 where it is cooled. The cold air subsequently passes through cold-air fan 86 and is exhausted into the bottle compartment through cold-air exhaust port 88. The cold air cools the bottle compartment noting that a thermistor in the cold air circuit is coupled with a potentiometer mounted on printed circuit board 50 to control the power of thermolelectric cooler 44 which in turn determines the temperature in the cold air circuit. This provides thermostatic control of the wine bottle temperature. A knob attached to potentiometer 52 allows for adjustment of the storage temperature.

As noted previously, although the present invention has been described in terms of preserving wine contained within a wine bottle as a preferred embodiment, this invention can also be employed for preserving other food products which are sensitive to the oxidative effects of ambient air. For example, coffee beans and ground coffee would benefit greatly through the use of the present invention.

We claim:

1. A device for storage of an open wine container comprising a housing for receiving said open wine container in a substantially vertical orientation and for replacing air within the open wine container with a heavier-than-air inert gas, said device comprising a poppet valve assembly including a valve body for insertion within an opening in said open wine container and biased to enable said device to accommodate open wine containers of varying sizes, a pressurized source of heavier-than-air inert gas located within said housing, a regulator for reducing the pressure of said inert gas from a first pressure at said pressurized source of heaver-than-air inert gas to a second pressure that passes through a low pass port within said poppet valve assembly, said poppet valve assembly comprising a valve body, a low pass port, a spring-loaded check ball being spring biased to close said low pass port, a shuttle slidable within said valve body and orifice wherein said spring loaded check ball is biased to close said low pass port to facilitate increasing pressure within said low pass port until said pressure is sufficient to cause said shuttle to rise upwards within said valve body thus being displaced from said open wine container whereupon as said shuttle rises, air contained within said open wine container is freed to exit proximate the bottle top while increasing pressure in said low pass port unseats said check ball from blocking said low pass port within said shuttle for enabling the heavier-than-air inert gas to enter said wine container displacing air that had been in said bottle and upon interrupting the flow of said heavier-than-Sir inert gas, forcing said shuttle by spring bias against said open wine container sealing said open wine container to substantially prevent said heavier-than-air inert gas from escaping therefrom.

2. The device of claim 1 wherein said opened wine container comprises an opened wine bottle containing liquid wine and an air space there above.

3. The device of claim 1 wherein said device further comprises cooling means for controllably heating or cooling said opened wine container.

4. The device of claim 3 wherein said cooling means comprises a thermoelectric cooler.

5. The device of claim 1 wherein said valve body is perforated to facilitate the passage of air there through.

6. The device of claim 1 further comprising an activation lever accessible from outside of said housing for selectively receiving said heavier-than-air inert gas from its pressurized source for delivery to said poppet valve assembly.

7. The device of claim 1 wherein said pressurized source of heavier-than-air inert gas comprises a gas cartridge replaceable within said housing.

8. The device of claim 7 wherein said gas cartridge is attached to said gas pressure regulator by a threaded safety barrel.

9. The device of claim 1 wherein said heavier-than-air inert gas comprises argon.

10. The device of claim 1 wherein said housing further includes a transparent window for viewing said opened wine container there through.

11. The device of claim 1 wherein said poppet valve assembly is mounted on guide pins provides for vertical movement of said poppet valve assembly thereon.

12. The device of claim 11 further comprising springs mounted axially about said guide pins to bias said poppet valve assembly in the direction of said opened wine container.

13. The device of claim 1 wherein said gas pressure regulator comprises a counter-balanced spring, plenum and flow control needle.

14. The device of claim 1 wherein a flexible conduit is provided between said regulator and poppet valve assembly for carrying said heavier-than-air inert gas at a pressure of approximately 15-to-20 psi.

15. The device of claim 1 further comprising poppet exhaust ports for facilitating the exhaust of air from within said opened wine container as said heavier-than-air inert gas is introduced therein.

16. The device of claim 15 wherein said housing is provided with an exhaust vent port for venting air received from said poppet exhaust ports.

17. The device of claim 15 wherein said shuttle is spring biased such that as the heavier-than-air inert gas flow is interrupted and gas pressure is consequently eliminated from said poppet valve assembly, said shuttle is forced against said opening in said opened wine container.

18. The device of claim 17 wherein said shuttle is provided with a gasket for substantially selectively sealing said opening in said opened wine container.

19. The device of claim 18 wherein said check ball substantially prevents backflow of either air or heavier-than-air inert gas.

20. A device for storage of an open food container comprising a housing for receiving said open food container in a substantially vertical orientation and for replacing air within the open food container with a heavier-than-air inert gas, said device comprising a poppet valve assembly including a valve body for insertion within an opening in said open food container and biased to enable said device to accommodate open food containers of varying sizes, a pressurized source of heavier-than-air inert gas located within said housing, a regulator for reducing the pressure of said inert gas from a first pressure at said pressurized source of heaver-than-air inert gas to a second pressure that passes through a low pass port within said poppet valve assembly, said poppet valve assembly comprising a valve body, a low pass port, a spring-loaded check ball being spring biased to close said low pass port, a shuttle slidable within said valve body and orifice wherein said spring loaded check ball is biased to close said low pass port to facilitate increasing pressure within said low pass port until said pressure is sufficient to cause said shuttle to rise upwards within said valve body thus being displaced from said open food container whereupon as said shuttle rises, air contained within said open food container is freed to exit proximate the container top while increasing pressure in said low pass port unseats said check ball from blocking said low pass port within said shuttle enabling the heavier-than-air inert gas to enter said food container displacing air that had been in said open food container and upon interrupting the flow of said heavier-than-air inert gas, forcing said shuttle by spring bias against said open food container sealing said open food container to substantially prevent said heavier-than-air inert gas from escaping therefrom.

21. The device of claim 6 wherein said opened food container contains coffee.

* * * * *